(12) United States Patent
Nicoletti

(10) Patent No.: US 6,487,743 B1
(45) Date of Patent: Dec. 3, 2002

(54) Y-BRIDGE AIRPLANE PASSENGER GATEWAY

(75) Inventor: Bruce J. Nicoletti, Snohomish, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/998,371

(22) Filed: Nov. 29, 2001

(51) Int. Cl.⁷ .................................................. E01D 1/00
(52) U.S. Cl. ........................................ 14/71.5; 14/71.3
(58) Field of Search ................................ 14/69.5, 71.1, 14/71.3, 71.5

(56) References Cited

U.S. PATENT DOCUMENTS

| | | | |
|---|---|---|---|
| 3,184,772 A | * 5/1965 | Moore et al. | ................ 14/71.5 |
| 3,524,207 A | 8/1970 | Giarretto | |
| 3,538,529 A | 11/1970 | Breier | |
| 3,541,743 A | 11/1970 | Kness | |
| 3,722,017 A | * 3/1973 | Gacs et al. | ................. 14/71.5 |
| 3,728,754 A | 4/1973 | Lodjic | |
| 3,747,147 A | 7/1973 | Weese | |
| 3,793,662 A | 2/1974 | Gacs et al. | |
| 3,808,626 A | * 5/1974 | Magill | ........................ 14/71.5 |
| 3,839,760 A | 10/1974 | Nagy | |
| 5,791,003 A | * 8/1998 | Streeter et al. | .............. 14/71.5 |

FOREIGN PATENT DOCUMENTS

DE     1814165     8/1970

* cited by examiner

Primary Examiner—Gary S. Hartmann
(74) Attorney, Agent, or Firm—Black Lowe & Graham PLLC

(57) ABSTRACT

A substantially rectangular mobile platform with a plurality of vertically adjustable supports is provided for transferring passengers between a single corridor passageway of an airport and an aircraft having a plurality of doors on a side of an aircraft. A first room is mounted on the mobile frame and has a first portal for docking with a doorway of the single corridor passageway. A second room and a third room are slidably receivable within and extendable from the first room. The second room has a first vestibule that extends substantially normally from the second room to dock with a first aircraft door via a second portal, and the third room has a second vestibule that extends substantially normally from the third room to dock with a second aircraft.

14 Claims, 6 Drawing Sheets

US 6,487,743 B1

Y-BRIDGE AIRPLANE PASSENGER GATEWAY

FIELD OF THE INVENTION

This invention relates generally to passenger aircraft loading systems.

BACKGROUND OF THE INVENTION

An ability to rapidly load and unload passengers from commercial aircraft is a growing concern to commercial airlines and airport management. An increase in commercial airline use by the traveling public places more stress on the finite capabilities of airports to handle increasing passenger traffic. To handle this increasing passenger traffic, an increasing number of arriving and departing aircraft are scheduled to operate at airports having a limited number of available jetways. To better move the increasing passenger traffic with more aircraft requires a significant improvement in unloading and loading passengers at the aircraft jetways, thereby reducing the disembarking and embarking times of the aircraft.

The time to unload passengers from an arriving aircraft and then load the same aircraft for its subsequent departing flight is referred to as airplane "turn time." Airlines and airport management are concerned with achieving shorter turn times so that airplanes can depart quickly. Shorter turn times allow more aircraft to be processed by the finite number of jetways at a given airport.

Reduced turn times are particularly desirable with flights having only a short time available at a particular airport. If the turn time cannot be reduced to match the allotted jetway time, then the airline may fly less cycles for a particular airplane in any given day. This change can lead to non-optimum utilization of airplanes. Alternately, additional airplanes may be needed to satisfy airline objectives of optimizing passenger arrival and departure times. Changes in number of cycles per day or the number of airplanes required significantly impacts the amount of revenue that can be generated.

Airlines have explored various ways to reduce turn times. One attempt to reduce airplane turn time is through sectional loading or selective loading by zones. In selective loading by zones, passengers are boarded in seat groupings wherein the passengers sitting in forward or aft sections first. Thereafter, sections of the plane that are aft of the forward sections and forward of the aft sections are loaded, filling seats closer to the entry door.

Although sectional loading helps, to a small degree, in reducing the time to load an airplane with passengers, sectional loading cannot be optimized beyond levels achievable through a single airplane door. All passengers load onto an airplane single file through a single door. Furthermore, zone loading applies only to passengers embarking on a plane. Zone loading has no application in decreasing the time for disembarking passengers. All passengers leave the airplane single file through a single airplane door. Thus, as most airport jetways are designed to direct passengers through a single door, turn times become constrained by the physical limitations of how fast passengers can transit through a single door opening.

Airplane turn times can be reduced if more than one door of the aircraft is used in unloading and loading passengers. Studies involving a Boeing 757–200 aircraft having 236 seats demonstrate that turn times are significantly reduced when both airplane doors were used for loading and unloading. The results show that using doors 1 and 2 to load and unload passengers reduces the turn time by approximately 5 minutes over using door 1 alone. In addition, using doors 1 and 2 with an additional zone loading procedure results in a further reduction in turn time of 17 minutes over the single door 1 loading and unloading. This decrease in turn time substantially cuts the turn time in half over the conventional door 1 procedure.

Since most airports utilize single channel jetways that lead to a single airplane door, there is an unmet need to provide a means for single channel jetways to simultaneously attach to more than one airplane door, thereby reducing airplane turn times.

SUMMARY OF THE INVENTION

The present invention allows an existing single corridor jetway to be converted to a multi-corridor jetway. Each corridor leads to a separate aircraft door. This permits passengers to select different entry routes to the plane, thereby reducing the time-consuming loading and unloading procedures of single-file passing through a single airplane door. By simultaneously loading and unloading passengers through two or more doors rather than one, a desired reduction in airplane turn times is achieved.

The present invention is a mobile platform for transferring passengers between a single corridor passageway of an airport and an aircraft having a plurality of doors on a side of the aircraft. The mobile frame is substantially rectangular and has a plurality of vertical adjustable supports. A first room is mounted on the mobile frame. The first room has a first portal for docking with a doorway of the single corridor passageway of the airport. A second room is slidably receivable within and extendable from the first room. The second room has a first vestibule that extends substantially normally from the second room. The first vestibule defines a portal for docking with a first aircraft door. A third room is attached to the first room. The third room has a second vestibule that extends substantially normally from the third room. The second vestibule defines a third portal for docking with a second aircraft door. A positioning assembly is used to slidably extend the second and third rooms from the first room and to slidably retract the second and third rooms into the first room such that the second and third portals align with the first and second aircraft doors.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
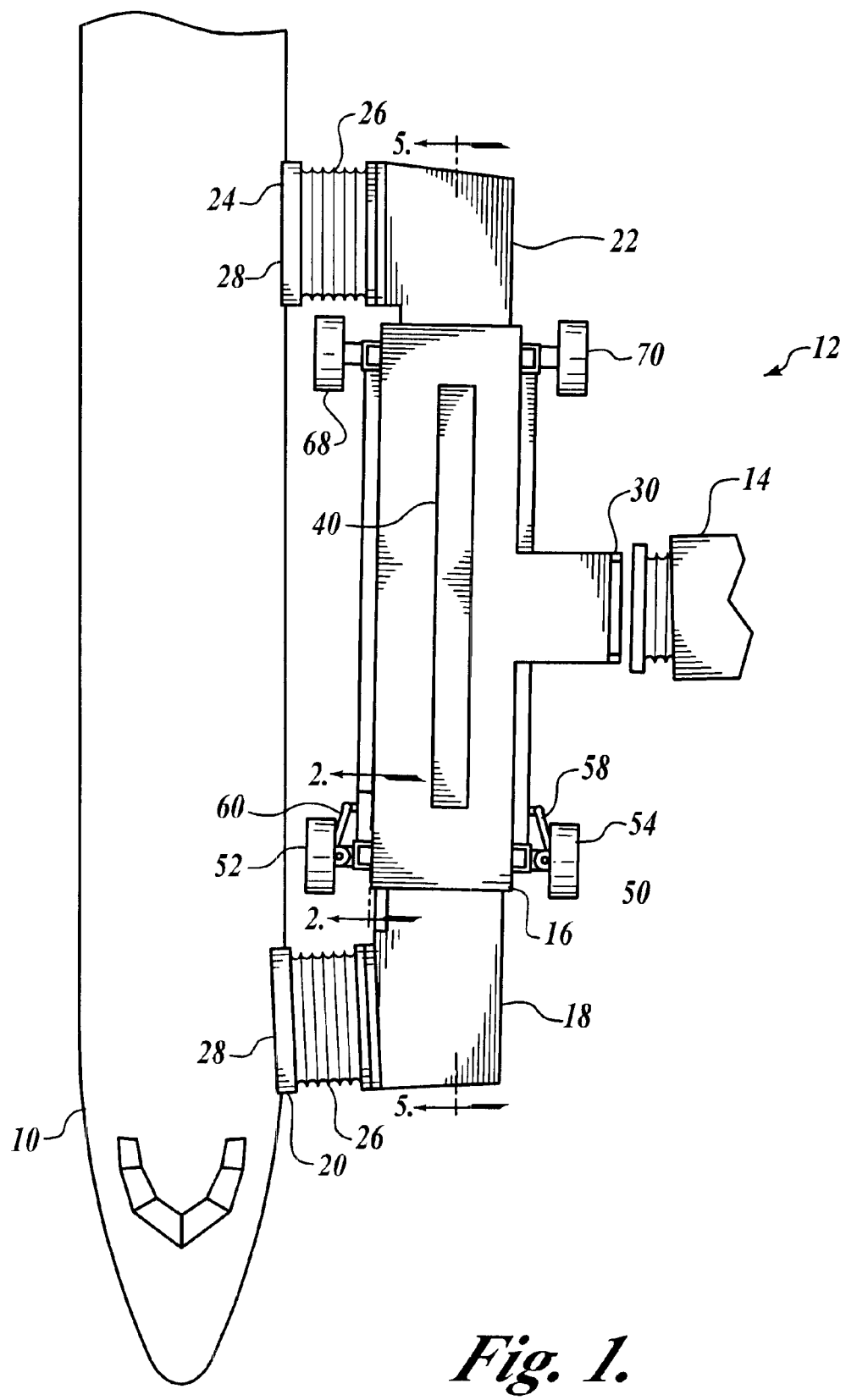
FIG. 1 is a top plan view of the gateway docked to an aircraft having two doors.

FIG. 1 shows a passenger gateway 12 docking with a forward door 20 and an aft door 24 on an aircraft 10, and docking with a jetway 14. According to the invention, the gateway 12 includes three sections, a middle section 16 that attaches to the jetway 14, a left section 18 that attaches to the forward door 20, and a right section 22 that attaches to the aft door 24. The left section 18 and the right section 22 are adjustably connected to the middle section 16. This adjustable connection permits the right section 18 and the left section 22 to slide in and out of the middle section 16. At the end of the right and left sections 22 and 18, a vestibule 26 attaches to the side of the aircraft 10 at the forward door 20 and aft door 24. The middle section 16 has a jetway port 30 that connects to the jetway 14. The vestibule 26 is preferably constructed of a flexible material capable of conforming to the shape of the exterior of the aircraft 10 in the region around the forward and aft doors 20 and 24. At the end of each vestibule 26, a non-marring seal 28 contacts the exterior of aircraft 10 near the forward and aft doors 20 and 24.

The right section 22 and left section 18 slide in and out of the middle section 16 by internal tracks (not shown) located between middle section 16 and right 22 and left 18 sections. The tracks are located in the floors and ceilings of sections 18 and 22 and align with tracks in the floor and ceiling of middle section 16. The sections 22, 16, and 18 are constructed of metal or equivalently strengthened panel materials to handle the weight of passengers, luggage, and commonly used aircraft servicing equipment transportable from the jetway 14 to aircraft 10.

View line A—A refers to a vertical support that makes up and down vertical adjustments of gateway 12 with doors 20 and 24 of aircraft 10. View line B—B cuts across right section 22, middle section 16, and left section 18. Within middle section 16, view line B—B cuts through a positioning housing 40 located above and beneath middle section 16. The positioning housing 40 contains motors and drive screws (not shown) for making sideway adjustments of gateway 12 between doors 20 and 24 of aircraft 10 by causing the right and left sections 22 and 18 to slide into and out of the middle section 16.

Figure 2:
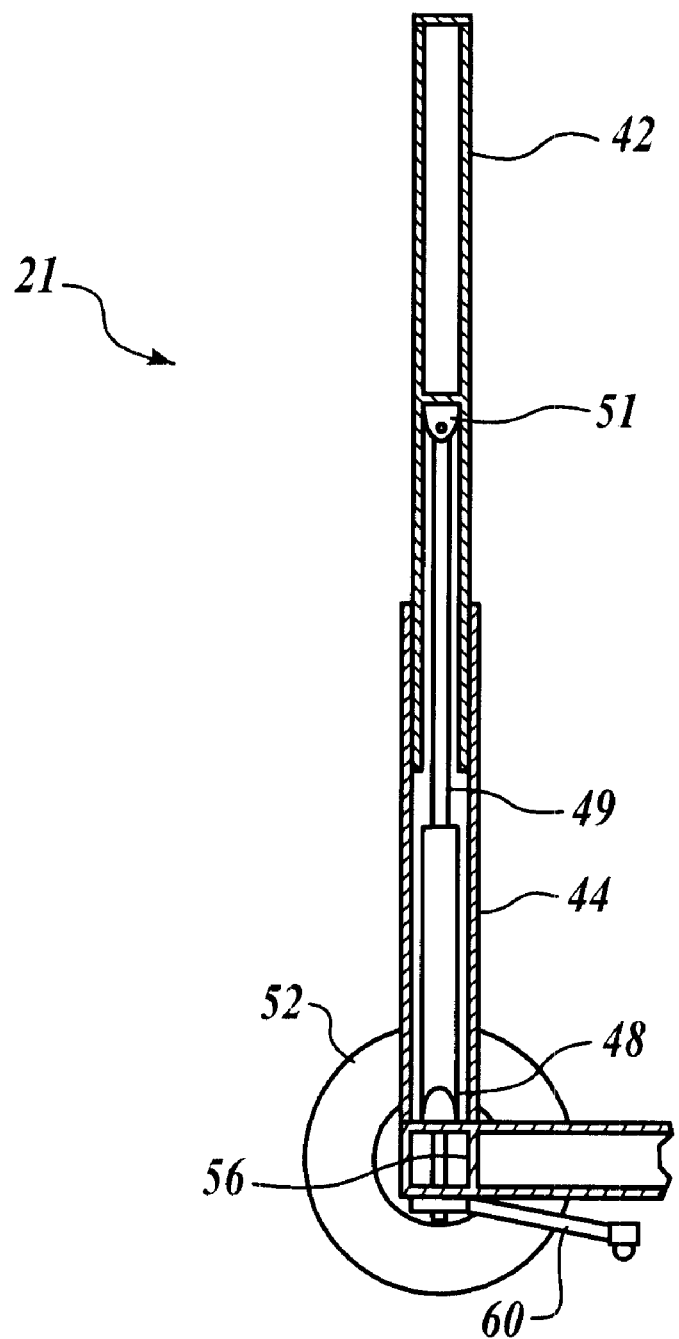
FIG. 2 is a cross-sectional view of a vertical support.

FIG. 2 shows components of one of four vertical supports 21 as seen from view line A—A. The components of the vertical support 21 include an inner sleeve 42 engaged with outer sleeve 44. The inner sleeve 42 is attached to the middle section 16 via bolts, welds, or other suitable attachments. Within inner sleeve 42 resides piston 51 that communicates with hydraulic cylinder 49 to provide vertical adjustments of gateway 12 so the left and right sections 18 and 22 are at a height to attach to the first and second doors 20 and 24. Hydraulic action from cylinder 49 communicates with piston 51, thereby causing inner sleeve 42 to slide within outer sleeve 44. Pin 56 secures lower attachment 48 and outer sleeve 44 to horizontal frame 46. Rod 60, coupled to the bottom of outer sleeve 44, is coupled to a wheel and steerage system (not shown) for turning the vertical support 21. Vertical support 21 is transportable through wheel 52.

Figure 3:
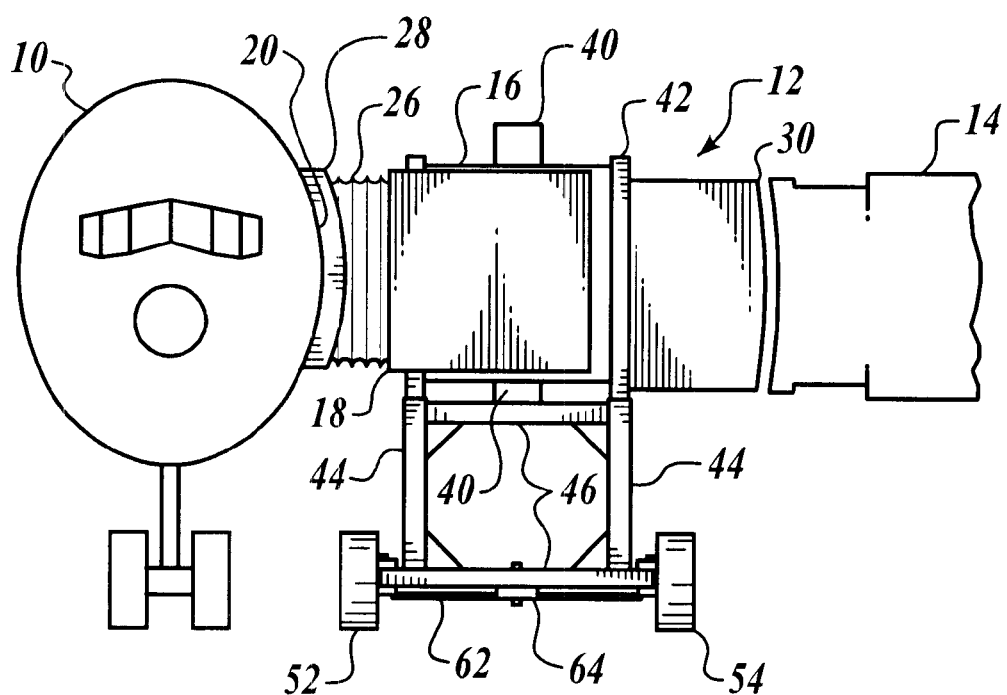
FIG. 3 is a side view of the gateway.

FIG. 3 is a side view of the gateway 12 docking with aircraft door 20 via vestibule 26 and docking with jetway 14 via jetway port 30. The jetway port 30 is contoured similar to the aircraft exterior and docks to jetway 14. The vestibule 26 extends from the left section 18 towards aircraft door 20. Vestibule 26 is secured to door 20 via seal 28.

The gateway 12 is supported by a horizontal framework 46. The outer sleeve 44 is secured to horizontal framework 46. Inner sleeve 42 extends from the outer sleeve. The positioning housing 40 is shown located above and below the middle section 16. Wheels 52 and 54 are shown in relation to tow bar tongue 64, tie rod 62, and horizontal framework 46.

Figure 4:
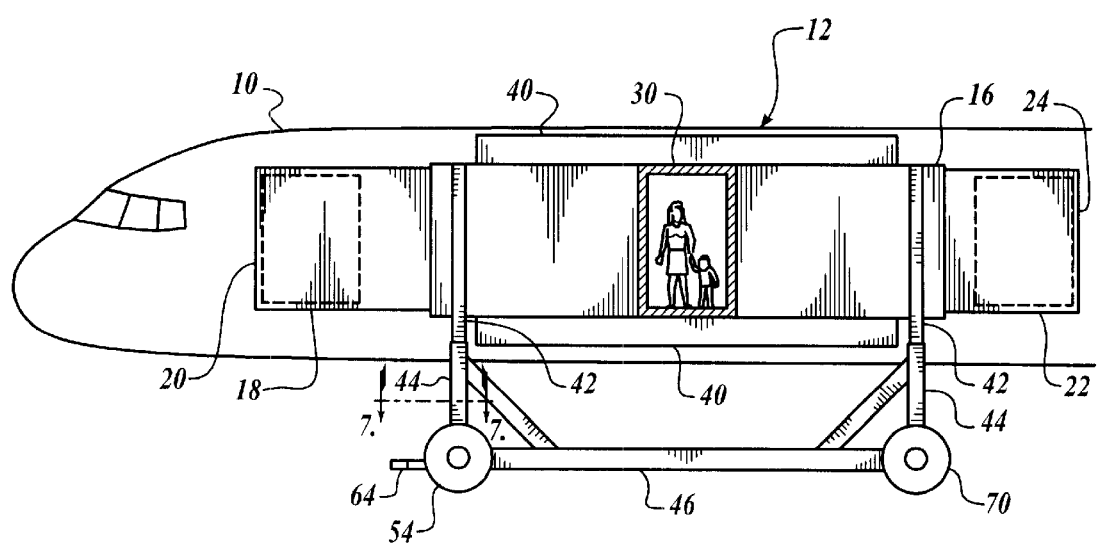
FIG. 4 is a cutaway view of the gateway.

FIG. 4 is a midsection cutaway view of the gateway 12 docked with the forward and aft doors 20 and 24. Passengers are seen in the vicinity of jetway port 30. The gateway 12 is supported by the horizontal framework 46, via the inner sleeves 44 mounted at each end of the horizontal framework 46. From middle section 16, left section 18 and right section 22 extend to dock with aircraft doors 20 and 24. Motorized mechanisms within housing 40 provide the horizontal movement for left section 18 and right section 22. View line D—D is over wheel and steerage system near wheel 54.

Figure 5:
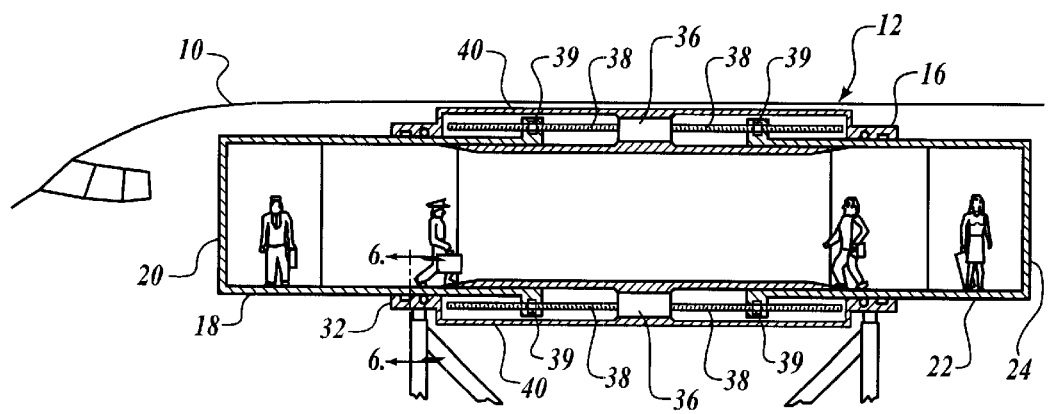
FIG. 5 is a cross-sectional view of the gateway midsection.

FIG. 5 is a cutaway view of gateway 12 along view line B—B. Gateway 12 is shown docked with the doors 20 and 24 wherein passengers can be seen emerging from doors 20 and 24 through left section 18 and right section 22. Above and below middle section 16 is shown a cutaway view of positioning housing 40 containing electric motor 36 and drive screws 38 that engage with threaded collars 39. Sections 18 and 22 are moved as motors 36 rotates drive screws 38 through threaded collars 39 to produce a translation movement to sections 18 and 22. A reverse in the translation movement to sections 18 and 22 occurs when the motors 36 reverses rotation movement and similarly transmits the reverse rotation movement through drive screws 38, thence to threaded collars 39. Passengers are depicted disembarking from the aircraft 10 through forward door 20, turning left to enter the gateway 12, then turning right to approach the jetway port 30 (not shown). Passengers similarly disembark from the aircraft 10 from the aft door 24 of the airplane, exiting through the aft door 24 and turning right to approach the jetway port 30 (not shown). Embarking onto the aircraft 10 reverses the disembarking process.

Figure 6:
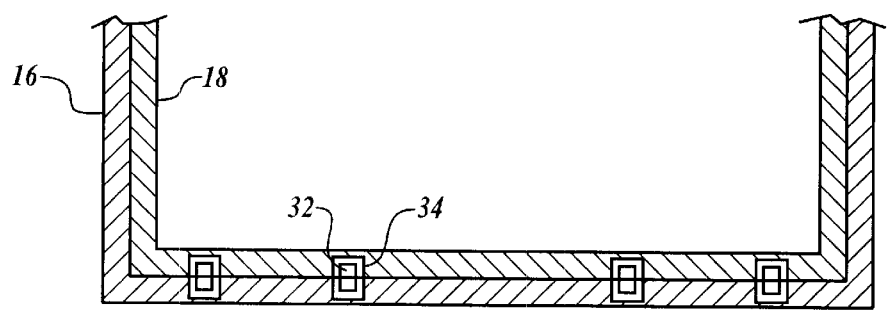
FIG. 6 is a cross-sectional view of a rail and guidance tracks.

FIG. 6 is a cross-sectional view showing guidance tracks taken along view line C—C of FIG. 5. View line C—C cuts through the bottom portions of middle section 16, left section 18, and track 32 located between bottom portions of middle section 16 and left section 18. Tracks 32 align with guide 34, thereby providing a sliding configuration between left section 18 as the left section 38 telescopically extends from or retracts into middle section 16. Left section 18 is shown internal to middle section 16.

Figure 7:
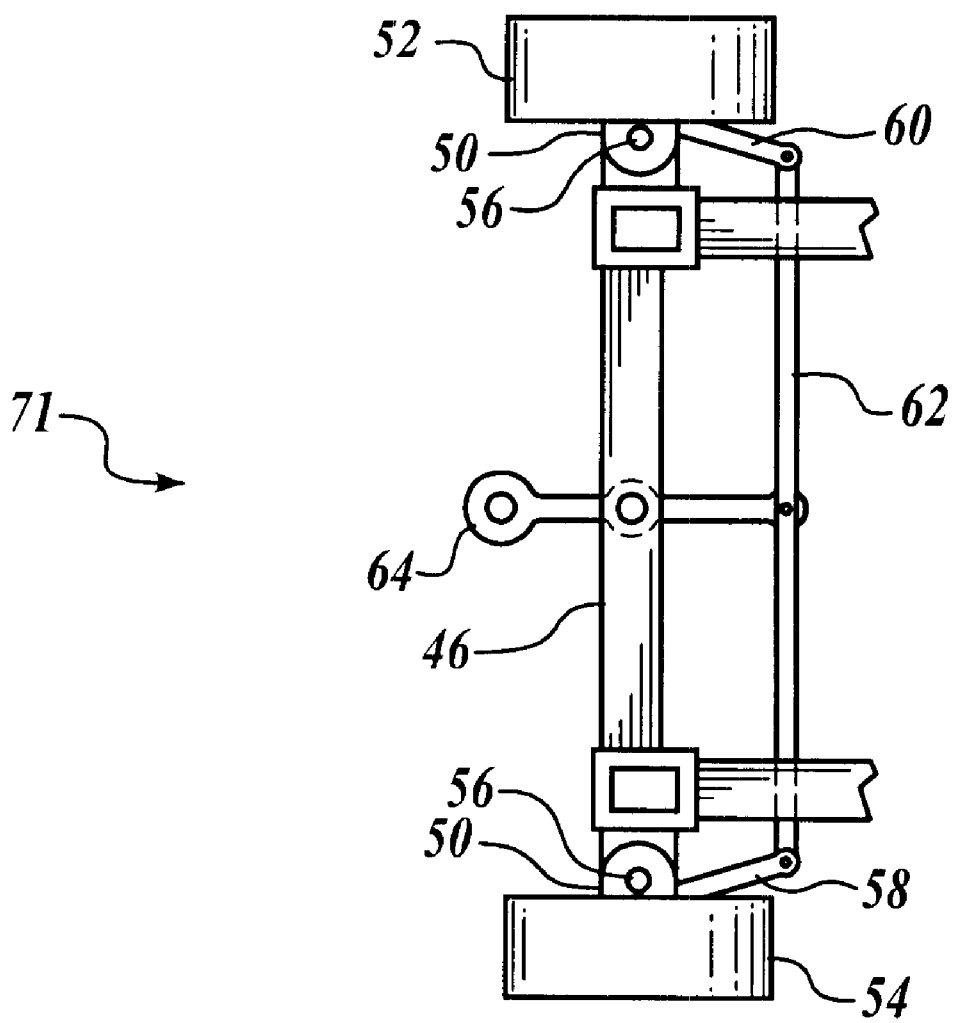
FIG. 7 is a cross-sectional view of a wheel and steerage system.

FIG. 7 is a cross-sectional view along view line D—D of a wheel and steerage system. The wheels 52 and 54 are located on either side of horizontal framework 46. Each of the wheels 52 and 54 are rotatable through hinge 50 mounted to framework 46 with 35 pin 56. Steering is achieved via the movement of tie rod 62 connected to left rod 60 and right rod 58. A tow bar tongue 64 is attached to the horizontal frame 46 and the tie rod 62. The wheel and steerage system allows the front wheels 52, 54 to be steered by moving the tow bar tongue 64, thereby allowing gateway 12 to be moved to any desirable position using any suitable tow vehicle, such as a tug, readily available at most airports.

While the preferred embodiment of the invention has been illustrated and described, as noted above, many changes can be made without departing from the spirit and scope of the invention. For example, the invention also applies to cargo planes and in servicing galleys of airplanes via aft doors. Accordingly, the scope of the invention is not limited by the disclosure of the preferred embodiment. Instead, the invention should be determined entirely by reference to the claims that follow.

What is claimed is:

1. A mobile platform for transferring passengers between a single corridor passageway of an airport and an aircraft having a plurality of doors on a side of the aircraft, the platform comprising:

a substantially rectangular mobile frame having a plurality of vertically adjustable supports;

a first room mounted on the vertically adjustable supports, the first room defining a first portal for docking with a doorway of the single corridor passageway at the airport;

a second room slidably receivable within and extendable from the first room, the second room having a first vestibule extending substantially normally therefrom, the first vestibule defining a portal for docking with a first aircraft door;

a third room slidably receivable within and extendable from the first room, the third room having a second vestibule extending substantially normally therefrom, the second vestibule defining a third portal for docking with a second aircraft door; and a positioning assembly arranged to slidably extend the second and third rooms from the first room and to slidably retract the second and third rooms into the. first room such that the second and third portals align with the first and second aircraft doors.

2. The platform of claim 1, wherein the plurality of vertically adjustable supports includes four vertical supports, the vertical supports being attached to the frame toward corners of the frame.

3. The platform of claim 2, wherein each vertical support includes:

an outer sleeve attached to the frame, the outer sleeve having a bottom portion and including a piston, wherein the piston has a lower portion and an upper portion, the lower portion of the piston being attached to the bottom portion of the outer sleeve; and an inner sleeve received within the outer sleeve and attached to the upper portion of the piston, the inner sleeve being urged vertically by the piston.

4. The platform of claim 1, wherein the positioning assembly includes a set of tracks and guides disposed within the first, second, and third rooms, the tracks being received within the guides, such that a rail is formed on which the second and third rooms are slidably received within or extended from the first room.

5. The platform of claim 4, wherein the positioning assembly includes a motor and a drive screw mounted in the first room.

6. The platform of claim 1, further comprising first and second vestibule positioning assemblies, each vestibule position assembly including a rack and a bellows, wherein the rack urges the bellows from the vestibule toward one of the first and second aircraft doors.

7. The platform of claim 6, wherein the bellows are lined with a seal that flexibly contours with a fuselage of an airplane and has a shape defined by the first and second aircraft doors.

8. A mobile platform for transferring passengers between a single corridor passageway of an airport and an aircraft having a plurality of doors on a side of the aircraft, the platform comprising:

a substantially rectangular mobile frame having a plurality of vertically adjustable supports, each vertical support being attached to the mobile frame toward corners of the mobile frame, wherein each vertical support includes:

an outer sleeve attached to the frame, the outer sleeve having a bottom portion and including a piston, wherein the piston has a lower portion and an upper portion, the lower portion of the piston being attached to the bottom portion of the outer sleeve; and an inner sleeve received within the outer sleeve and attached to the upper portion of the piston, the inner sleeve being urged vertically by the piston;

a first room mounted on the vertically adjustable supports, the first room defining a first portal for docking with a doorway of a single corridor passageway at an airport;

a second room slidably receivable within and extendable from the first room, the second room having a first vestibule extending substantially normally therefrom, the first vestibule defining a portal for docking with a first aircraft door;

a third room slidably receivable within and extendable from the first room, the third room having a second vestibule extending substantially normally therefrom, the second vestibule defining a third portal for docking with a second aircraft door; and a positioning assembly arranged to slidably extend the second and third rooms from the first room and to slidably retract the second and third rooms into the first room such that the second and third portals align with the first and second aircraft doors, the positioning assembly including a set of tracks and guides disposed within the first, second, and third rooms, the tracks being received within the guides, such that a rail is formed on which the second and third rooms are slidably received within or extended from the first room.

9. The platform of claim 8, wherein the positioning assembly further includes a motor and a drive screw mounted in the first room.

10. The platform of claim 8, further comprising first and second vestibule positioning assemblies, each vestibule position assembly including a rack and a bellows, wherein the rack urges the bellows from the vestibule toward one of the first and second aircraft doors.

11. The platform of claim 10, wherein the bellows are lined with a seal that flexibly contours with a fuselage of an airplane and has a shape defined by the first and second aircraft doors.

12. A mobile platform for transferring passengers between a single corridor passageway of an airport and an aircraft having a plurality of doors on a side of the aircraft, the platform comprising:

a substantially rectangular mobile frame having a plurality of vertically adjustable supports, the plurality of vertically adjustable supports including four vertical supports, the vertical supports being attached to the frame toward corners of the frame;

a first room mounted on the vertically adjustable supports, the first room defining a first portal for docking with a doorway of a single corridor passageway at an airport;

a second room slidably receivable within and extendable from the first room, the second room having a first vestibule extending substantially normally therefrom, the first vestibule defining a portal for docking with a first aircraft door;

a third room slidably receivable within and extendable from the first room, the third room having a second vestibule extending substantially normally therefrom, the second vestibule defining a third portal for docking with a second aircraft door;

a positioning assembly arranged to slidably extend the second and third rooms from the first room and to slidably retract the second and third rooms into the first room such that the second and third portals align with the first and second aircraft doors, the positioning assembly including a motor and a drive screw mounted in the first room and a set of tracks and guides disposed within the first, second, and third rooms, the tracks being received within the guides, such that a rail is formed on which the second and third rooms are slidably received within or extended from the first room.

13. The platform of claim 12, attached to the frame, the outer sleeve having:
- a bottom portion and including a piston, wherein the piston has a lower portion and an upper portion, the lower portion of the piston being attached to the bottom portion of the outer sleeve; and
- an inner sleeve received within the outer sleeve and attached to the upper portion of the piston, the inner sleeve being urged by the piston.

14. The platform of claim 12, further comprising first and second vestibule positioning assemblies, each vestibule position assembly including a rack and a bellows lined with a seal, wherein the rack urges the bellows from the vestibule toward one of the first and second aircraft doors, the bellows being lined with a seal that flexibly contours with a fuselage of an airplane and has a shape defined by the aircraft doors.

* * * * *